(12) United States Patent
Krishnan

(10) Patent No.: US 7,826,914 B2
(45) Date of Patent: Nov. 2, 2010

(54) SYSTEM AND METHOD FOR TRACKING TRANSPORTS IN A PRODUCTION PROCESS

(75) Inventor: Anil Appunni Krishnan, Copenhagen (DK)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 12/147,749

(22) Filed: Jun. 27, 2008

(65) Prior Publication Data
US 2009/0326698 A1     Dec. 31, 2009

(51) Int. Cl.
*G06F 19/00* (2006.01)
*G06F 9/44* (2006.01)

(52) U.S. Cl. ................ 700/105; 700/112; 717/171
(58) Field of Classification Search ............ 700/105, 700/112; 717/168, 171
See application file for complete search history.

(56) References Cited

U.S. PATENT DOCUMENTS

| | | | |
|---|---|---|---|
| 7,218,980 B1 * | 5/2007 | Orshansky et al. | 700/99 |
| 7,437,205 B2 * | 10/2008 | Knipfer et al. | 700/106 |
| 7,725,891 B2 * | 5/2010 | Demuth et al. | 717/168 |
| 2003/0144757 A1 * | 7/2003 | Haschke et al. | 700/100 |
| 2006/0112189 A1 | 5/2006 | Demuth et al. | |
| 2006/0117311 A1 | 6/2006 | Demuth et al. | |
| 2006/0123392 A1 | 6/2006 | Demuth et al. | |
| 2010/0106279 A1 * | 4/2010 | Yamamoto | 700/105 |

FOREIGN PATENT DOCUMENTS

| | | | |
|---|---|---|---|
| EP | 1653349 A1 | 10/2004 | |
| EP | 1653348 A1 | 10/2007 | |

* cited by examiner

*Primary Examiner*—Albert DeCady
*Assistant Examiner*—Sivalingam Sivanesan
(74) *Attorney, Agent, or Firm*—Cantor Colburn LLP; James Palmer

(57) ABSTRACT

A method of tracking transports in a production process including processing a first transport in a first system, developing changes for the first transport, and updating the first system with the changes developed for the first transport. The method also includes processing a second transport in a second system, developing changes for the second transport, and updating the second system with the changes developed for the second transport. The method further includes moving the changes developed for the second transport to the first system, sequencing the changes developed for the first transport and the changes developed for the second transport in the first system, and processing a third transport in the first system. The third transport includes all of the changes developed for the first transport and all of the changes developed for the second transport.

18 Claims, 4 Drawing Sheets

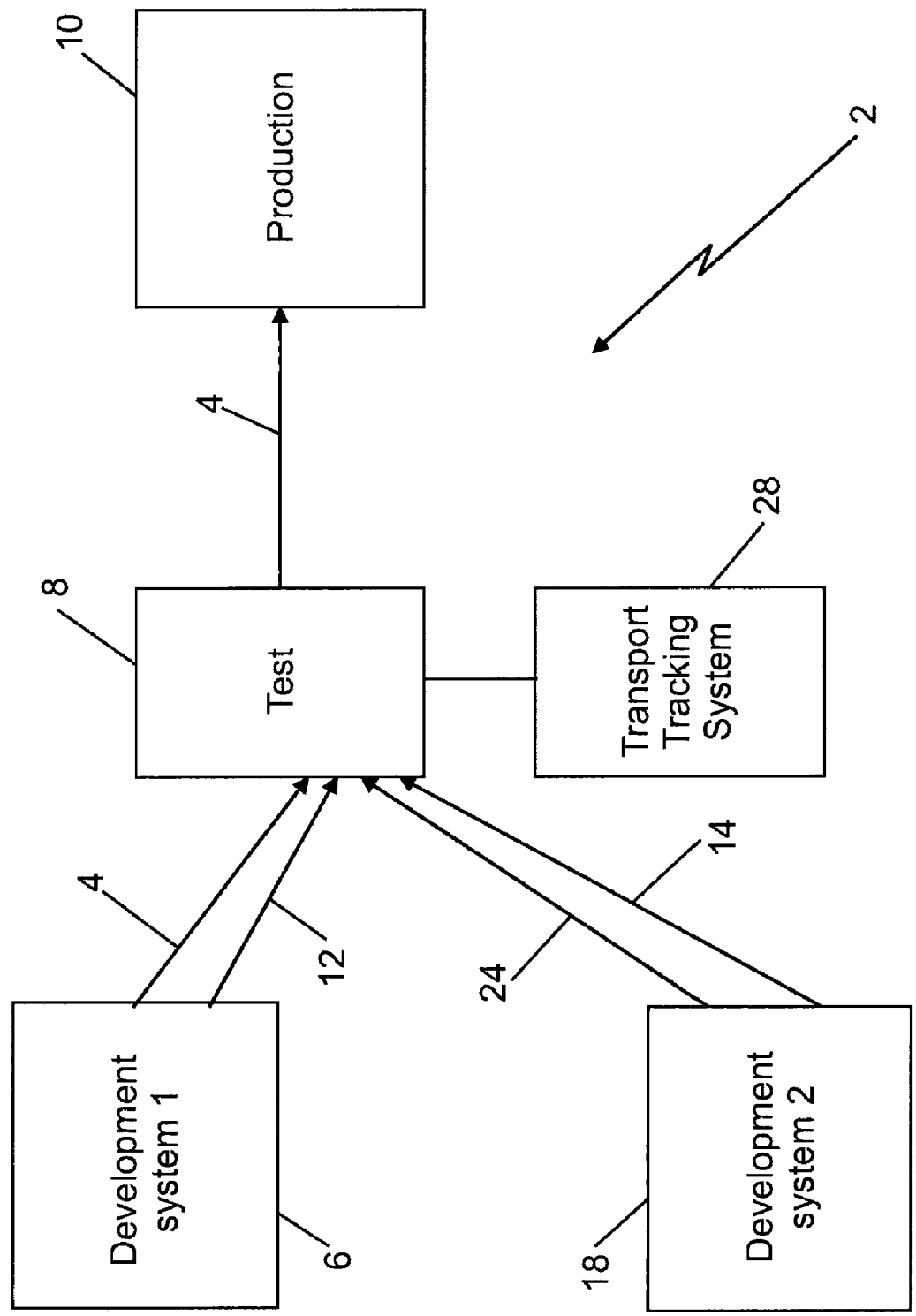

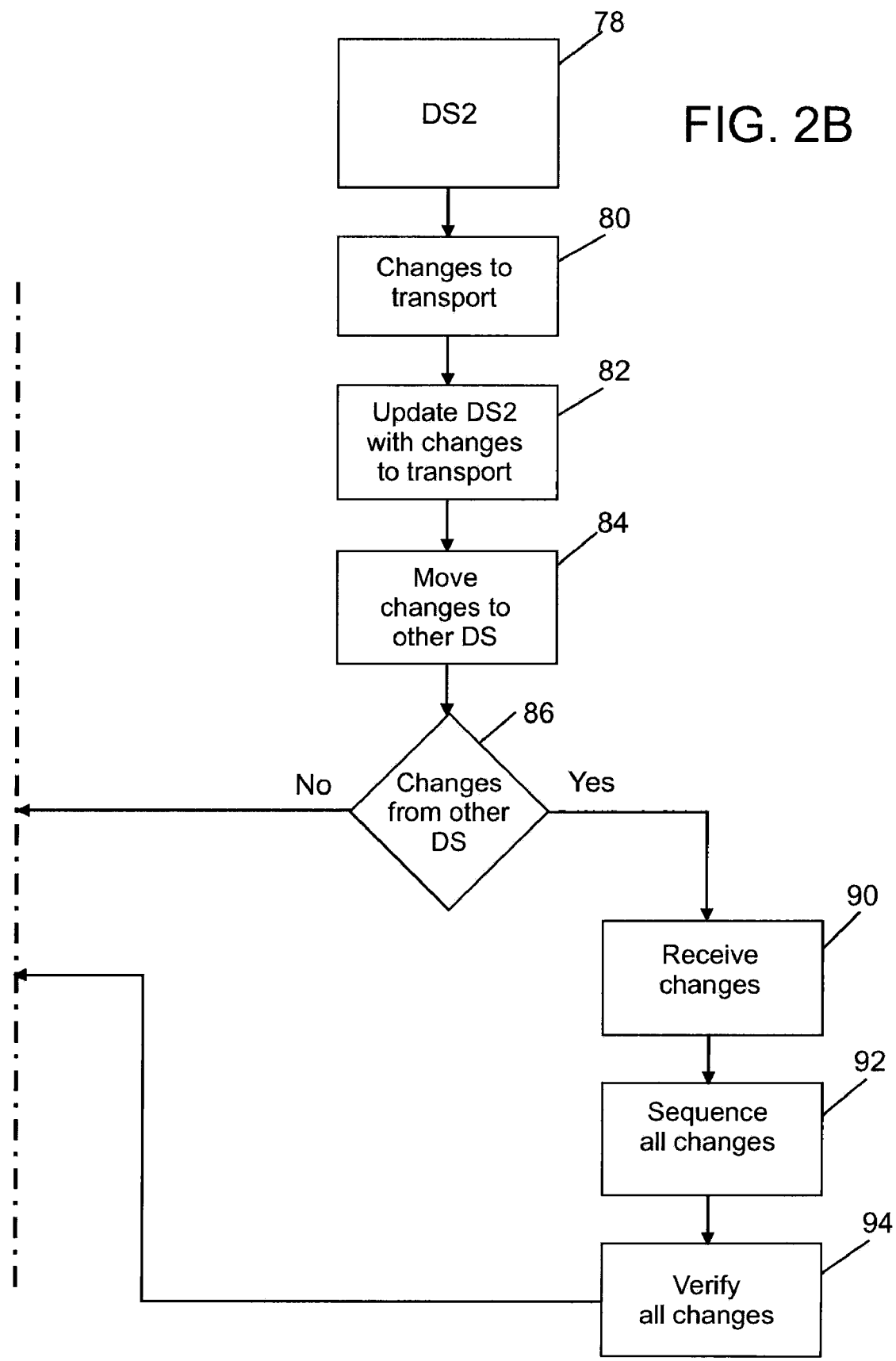

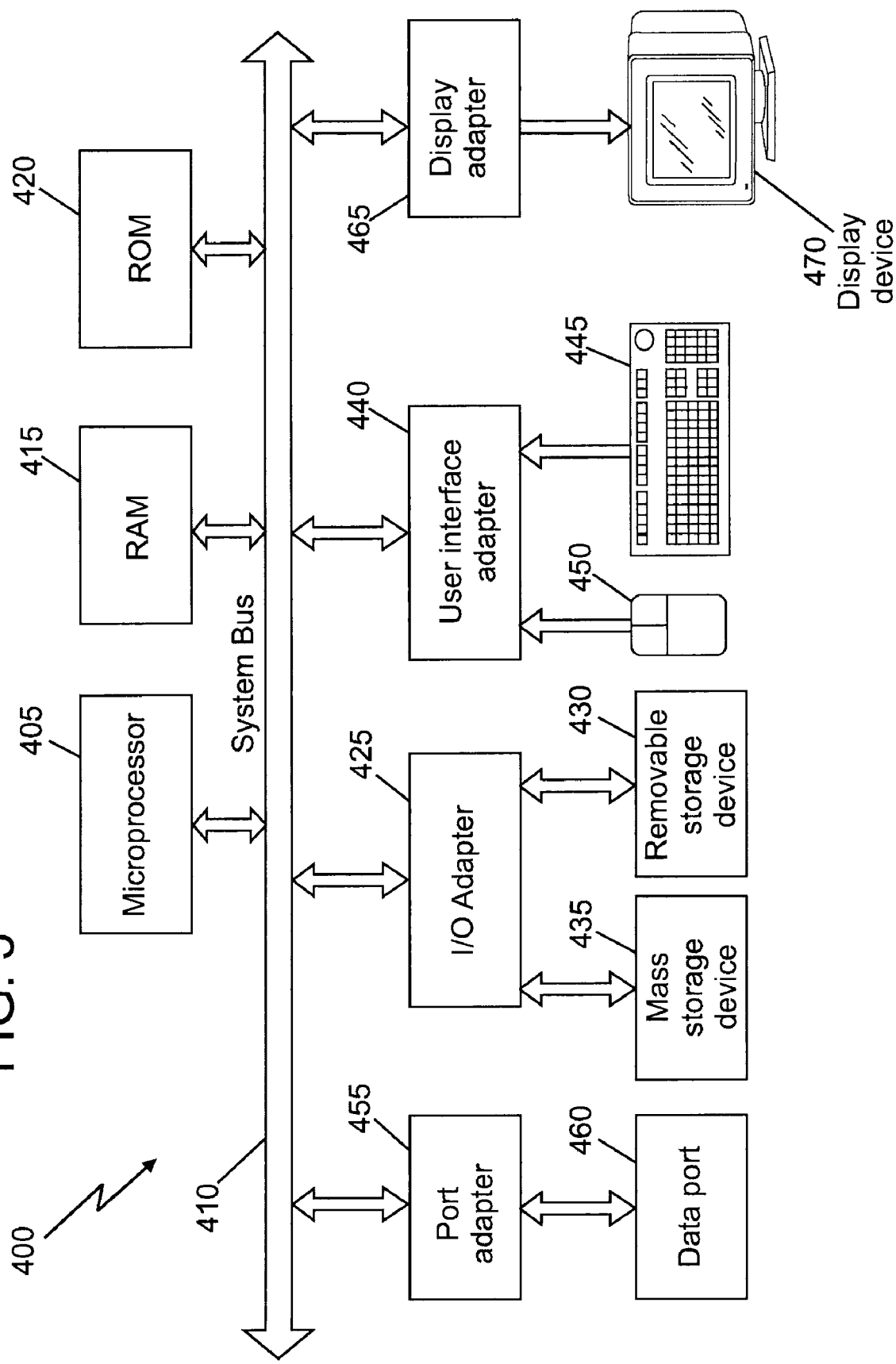

SYSTEM AND METHOD FOR TRACKING TRANSPORTS IN A PRODUCTION PROCESS

BACKGROUND OF THE INVENTION

This invention relates to the art of manufacturing and, more particularly, to a system and method for tracking transports in a production process.

DESCRIPTION OF BACKGROUND

Many manufacturing processes include multiple, separate development systems that feed into a single test system. The test system, in turn, is linked to a production line. Each development system is responsible for generating lots or transports for production. Often times, problems are discovered with a transport at the test system and/or in the production line. When a problem is discovered, engineers determine from which development system the transport originated. At this point, changes are made to the development system to correct the problem for future transports. Changes/updates are routinely made to each development system in order to ensure product quality and reliability.

In order to ensure product quality and reliability in each transport, when a change is made to one development system, corresponding changes are made to the remaining development systems. In many cases, the changes/updates are manually input into each development system. Manually inputting changes is both time consuming and prone to human error and thus inefficient. In other cases, the changes are moved/uploaded to each development system via a computer. Unfortunately, when moving/uploading changes from one development system to another, existing changes are overwritten. In this case, a transport originating at one development system may or may not contain the same changes/updates found in a transport originating at another development system. Non-uniformity among transports increases costs associated with testing and quality assurance as well increases a risk of long term of product reliability.

SUMMARY OF THE INVENTION

The shortcomings of the prior art are overcome and additional advantages are provided through the provision of a method of tracking transports in a production process including processing a first transport in a first system, developing changes for the first transport, and updating the first system with the changes developed for the first transport. The method also includes processing a second transport in a second system, developing changes for the second transport, and updating the second system with the changes developed for the second transport. The method further includes moving the changes developed for the second transport to the first system, sequencing the changes developed for the first transport and the changes developed for the second transport in the first system, and processing a third transport in the first system. The third transport includes all of the changes developed for the first transport and all of the changes developed for the second transport.

System and computer program products corresponding to the above-summarized methods are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

TECHNICAL EFFECTS

As a result of the summarized invention, technically we have achieved a solution which enables real time tracking of transport changes in a production process. Changes developed for each transport are moved to various development systems, merged with existing changes and sequenced so that each subsequent transport passing through each development system includes all changes developed for each transport throughout the production process.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a block diagram illustrating a production process including a system for tracking transports in accordance with an exemplary embodiment of the present invention;

FIG. 3 is a schematic block diagram of a general-purpose computer suitable for practicing the present invention exemplary embodiments.

Figure 2A:
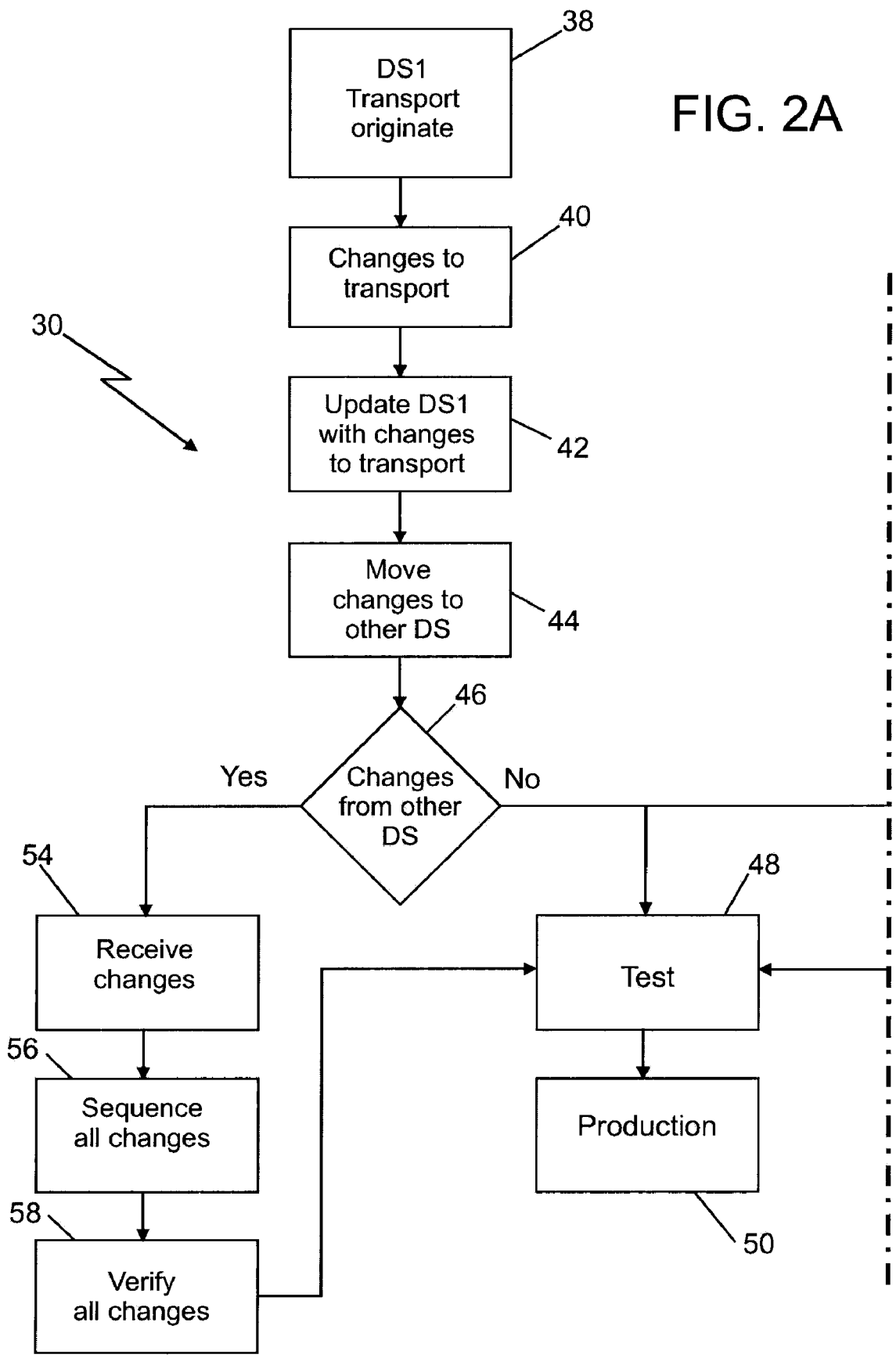
FIG. 2 is a flow diagram illustrating a method of tracking transports in accordance with exemplary embodiments of the present invention.

The detailed description explains the exemplary embodiments of the invention, together with advantages and features thereof, by way of example with reference to the drawings.

DETAILED DESCRIPTION OF THE INVENTION

With initial reference to FIG. 1, a production process operated in accordance with exemplary embodiments of the present invention is generally indicated at 2. In the exemplary embodiment shown, production process 2 is employed in the manufacture of semiconductors. However, it should be understood, that the present invention exemplary embodiments can be employed in a wide array of production processes. In any event, at the outset of production process 2, a transport 4, e.g., a semiconductor component or the like, originates at a development system 6. Transport 4 passes from development system 6 to a test system 8. At test system 8, transport 4 is checked for quality, reliability, functionality or is sampled for conformance to a predetermine standard. If the set guideline (s) for quality and performance is met, transport 4 is passed toward a production system 10 to be mass produced. Often times however, test system 8 reveals problems or weaknesses in transport 4 that require correction before being passed into production. In this case, any necessary changes are input to development system 6. In this manner subsequent transports passing from development system 6, such as transport 12 contain changes/upgrades not present in transport 4.

While transport 4 is being developed, tested and updated, another transport 14 is originating from another development system 18. In a manner similar to that described above, transport 14 first passes to test system 8. Test system 8 checks transport 14 for quality, reliability, functionality and/or conformance to a set standard. In a manner also similar to that described above, transport 14 often times will require changes/updates prior to passing to production system 10.

Any necessary changes/updates are imported to development system 18. At this point additional transports, such as transport 24 pass from development system 18 with upgrades not present in transport 14.

In order to avoid creating a vintage, e.g., transports leaving development system 6 with changes/updates that differ from transports leaving development system 18 and vice-versa, production process 10 includes a transport tracking system 28. As will be discussed more fully below, transport tracking system 28 ensures that changes/updates made to development system 6 are shared with development system 18, and changes made to development system 18 are shared with development system 6. In addition, transport tracking system 28 ensures that transports leaving each development system 6, 18 include all necessary changes/updates.

Reference will now be made to FIG. 2 in describing a method 30 of tracking transports through production process 10. Initially, a transport originates from development system 1 as indicated in block 38. As discussed above, the transport passes to test system 8 where a need for any changes/updates is determined as indicated in block 40. If necessary, changes/updates are developed and development system 6 is updated to reflect the new changes/updates as indicated in block 42. At this point, any changes made in development system 6 are moved/uploaded to all other development systems associated with production process 10 as indicated in block 44. In the exemplary embodiment shown, all changes made to development system 6 are moved/uploaded to development system 18. In addition to moving/uploading changes, transport tracking system 28 looks to see of changes are available to be received from other development systems as indicated in block 46.

If there are no changes indicated from other development systems, and all changes needed in development system 6 are current, transports begin to move to test system 8 as indicated in block 48 and on to production system 10 as indicated in block 50. If, on the other hand, changes have been made to other, associated, development systems, the changes are received at development system 6 as indicated at block 54. Once all changes are received, the changes are sequenced as indicated in block 56. More specifically, each change made at each development system is provided with a time stamp and a date stamp. Transport tracking system 28 utilizes the time and date stamps to sequence or order the changes at each development system. In this manner, transport tracking system 28 ensures that each development system is current with all necessary changes and, when new changes are uploaded, existing changes are not overwritten by the new changes. Thus, transports passing through each development system will include all necessary changes. In this manner, the chance of developing a particular vintage is eliminated. In any event, once the changes are sequenced, transport tracking system 28 verifies that all necessary changes have been made as indicated in block 58 before passing new transports to test system 8 as indicated in block 48 and on toward production process 10 in block 50.

In addition to developing transports in development system 6, other transports are originating from development system 18 as indicated in block 78. As discussed above, the other transports pass to test system 8 where a need for any changes/updates is determined as indicated in block 80. If changes are required, the changes/updates are developed and development system 18 is updated to reflect the new changes/updates as indicated in block 82. At this point, any changes made in development system 18 are moved/uploaded to all other development systems associated with production process 10 as indicated in block 84. In the exemplary embodiment shown, all changes made to development system 18 are moved/uploaded to development system 6. In addition to moving/uploading changes, transport tracking system 28 looks to see of changes are available to be received from other development systems as indicated in block 86.

If there are no changes indicated from other development systems, and all changes needed in development system 18 are current, transports begin to move to test system 8 as indicated in block 48 and on toward production system 10 as indicated in block 50. If, on the other hand, changes have been made to other, associated, development systems, the changes are received at development system 18 as indicated at block 90. Once all changes are received, the changes are sequenced as indicated in block 92. In a manner similar to that described above, each change made at each development system is provided with a time stamp and a date stamp. Transport tracking system 28 utilizes the time and date stamps to sequence, or order, the changes at each development system. In this manner, transport tracking system 28 ensures that each development system is current with all necessary changes and that, when any new changes are uploaded, existing changes are not overwritten by the new changes. Thus, transports passing through each development system will include all necessary changes. In this manner, the chance of developing a particular vintage in the transports is eliminated. In any event, once the changes are sequenced, transport tracking system 28 verifies that all necessary changes have been made as indicated in block 94 before passing new transports to test system 8 as indicated in block 48 and on to production process 10 in block 50.

At this point it should be appreciated that exemplary embodiments of the present invention ensure that all transports passing from each development system of a production process include the most current changes/updates. By providing time and date stamps for each change/update, and sequencing then updates in each development system, the transport tracking system prevents the creation of a vintage in the production process thereby producing development, production and cost efficiencies. In accordance with one exemplary aspect of the invention, the method of establishing an automated lot grade system for lots in semiconductor device manufacturing process scans each system in a given landscape to sequence changes to a particular transport for a target system. The term "landscape" is used to describe all development, test and production systems for a particular transport. In this manner, the method of establishing an automated lot grade system monitors each system while being independent from the landscape. That is, the method is configured to monitor/analyze the landscape from a remote system or is integrated into one of the systems of the landscape and configured to monitor/analyze each system of the landscape.

Generally, the method of establishing an automated lot grade system for lots in semiconductor device manufacturing process described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 4.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The flow diagrams depicted herein are just examples. There may be many variations to the diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of tracking transports in a production process, the method comprising:
   processing a first transport in a first system;
   developing changes for the first transport;
   updating the first system with the changes developed for the first transport;
   processing a second transport in a second system;
   developing changes for the second transport;
   updating the second system with the changes developed for the second transport;
   moving the changes developed for the second transport to the first system;
   sequencing the changes developed for the first transport and the changes developed for the second transport in the first system; and
   processing a third transport in the first system, the third transport including all of the changes developed for the first transport and all of the changes developed for the second transport.

2. The method of claim 1, further comprising:
   moving the changes developed for the first transport to the second system;
   sequencing the changes developed for the first transport and the changes developed for the second transport in the second system; and
   processing a fourth transport at the second system, the fourth transport including all of the changes developed for the first transport and all of the changes developed for the second transport.

3. The method of claim 2, further comprising:
   associating a first time stamp and a first date stamp with the changes developed for the first transport; and
   associating a second time stamp and a second date stamp with the changes developed for the second transport.

4. The method of claim 3, wherein sequencing the changes developed for the first transport and the changes developed for the second transport in the first system includes merging the changes developed for the second transport with the changes developed for the first transport based on at least two of the first time stamp, the first date stamp, the second time stamp and the second date stamp.

5. The method of claim 3, further comprising: displaying the changes developed for first transport and the changes developed for the second transport.

6. The method of claim 1, further comprising: testing the third transport to verify a presence of all of the changes developed for the first transport and a presence of all of the changes developed for the second transport.

7. A system for tracking transports in a production process comprising:
   a central processing unit (CPU), said CPU being interconnected functionally via a system bus to:
   an input/output (I/O) adapter connecting to at least one of a removable data storage device, a program storage device, and a mass data storage device; and
   at least one memory device thereupon stored a set of instructions which, when executed by said CPU, causes said system to:
   process a first transport in a first system;
   update the first system with changes developed for the first transport;
   process a second transport in a second system;
   update the second system with changes developed for the second transport;
   move the changes developed for the second transport to the first system;
   sequence the changes developed for the first transport and the changes developed for the second transport in the first system; and
   process a third transport in the first system, the third transport including all of the changes developed for the first transport and all of the changes developed for the second transport.

8. The system of claim 7, wherein the set of instructions which, when executed by said CPU, causes said system to:
   move the changes developed for the first transport to the second system;
   sequence the changes developed for the first transport and the changes developed for the second transport in the second system; and
   process a fourth transport at the second system, the fourth transport including all of the changes developed for the first transport and all of the changes developed for the second transport.

9. The system of claim 7, wherein the set of instructions which, when executed by said CPU, causes said system to:
   associate a first time stamp and a first date stamp with the changes developed for the first transport; and
   associate a second time stamp and a second date stamp with the changes developed for the second transport.

10. The system of claim 9, wherein the set of instructions which, when executed by said CPU, causes said system to: sequence the changes developed for the first transport and the changes developed for the second transport in the first system by merging the changes developed for the second transport with the changes developed for the first transport based on at least two of the first time stamp, the first date stamp, the second time stamp and the second date stamp.

11. The system of claim 9, wherein the set of instructions which, when executed by said CPU, causes said system to: display the changes developed for the first transport and the changes developed for the second transport.

12. The system of claim 7, wherein the set of instructions which, when executed by said CPU, causes said system to: test the third transport to verify a presence of all of the changes developed for the first transport and a presence of all of the changes developed for the second transport.

13. A computer program product comprising:
a computer useable medium including a computer readable program, wherein the computer readable program when executed on a computer causes the computer to implement a method of tracking transports in a production process, the method further comprising:
process a first transport in a first system;
update the first system with changes developed for the first transport;
process a second transport in a second system;
update the second system with changes developed for the second transport;
move the changes developed for the second transport to the first system;
sequence the changes developed for the first transport and the changes developed for the second transport in the first system; and
process a third transport in the first system, the third transport including all of the changes developed for the first transport and all of the changes developed for the second transport.

14. The computer program product of claim 13, wherein the computer readable program when executed on a computer causes the computer to:
move the changes developed for the first transport to the second system;
sequence the changes developed for the first transport and the changes developed for the second transport in the second system; and
process a fourth transport at the second system, the fourth transport including all of the changes developed for the first transport and all of the changes developed for the second transport.

15. The computer program product of claim 13, wherein the computer readable program when executed on a computer causes the computer to:
associate a first time stamp and a first date stamp with the changes developed for the first transport; and
associate a second time stamp and a second date stamp with the changes developed for to the second transport.

16. The computer program product of claim 15, wherein the computer readable program when executed on a computer causes the computer to: sequence the changes developed for the first transport and the changes developed for the second transport in the first system by merging the changes developed for the second transport with the changes developed for the first transport based on at least two of the first time stamp, the first date stamp, the second time stamp and the second date stamp.

17. The computer program product of claim 13, wherein the computer readable program when executed on a computer causes the computer to: display the changes developed for the first transport and the changes developed for the second transport.

18. The computer program product of claim 13, wherein the computer readable program when executed on a computer causes the computer to: test the third transport to verify a presence of all of the changes developed for the first transport and a presence of all of the changes developed for the second transport.

\* \* \* \* \*